(12) United States Patent
Yuen et al.

(10) Patent No.: US 10,809,974 B2
(45) Date of Patent: Oct. 20, 2020

(54) VOICE COMMANDS FOR ONLINE SOCIAL NETWORKING SYSTEMS

(71) Applicant: Facebook, Inc., Menlo Park, CA (US)

(72) Inventors: Jenny Yuen, Cambridge, MA (US); David Harry Garcia, Campbell, CA (US)

(73) Assignee: Facebook, Inc., Menlo Park, CA (US)

(*) Notice: Subject to any disclaimer, the term of this patent is extended or adjusted under 35 U.S.C. 154(b) by 316 days.

(21) Appl. No.: 15/727,132

(22) Filed: Oct. 6, 2017

(65) Prior Publication Data

US 2018/0032310 A1  Feb. 1, 2018

Related U.S. Application Data

(63) Continuation of application No. 14/708,567, filed on May 11, 2015, now Pat. No. 9,785,401, which is a continuation of application No. 13/652,767, filed on Oct. 16, 2012, now Pat. No. 9,043,703.

(51) Int. Cl.
| | |
|---|---|
| *G06F 3/16* | (2006.01) |
| *G06F 16/901* | (2019.01) |
| *G06Q 10/10* | (2012.01) |
| *G06F 3/048* | (2013.01) |
| *H04L 29/06* | (2006.01) |
| *H04L 29/08* | (2006.01) |
| *G06Q 50/00* | (2012.01) |

(52) U.S. Cl.
CPC .............. *G06F 3/167* (2013.01); *G06F 3/048* (2013.01); *G06F 16/9024* (2019.01); *G06Q 10/10* (2013.01); *H04L 65/403* (2013.01); *H04L 67/18* (2013.01); *G06Q 50/01* (2013.01)

(58) Field of Classification Search
None
See application file for complete search history.

(56) References Cited

U.S. PATENT DOCUMENTS

| | | | |
|---|---|---|---|
| 9,681,093 B1* | 6/2017 | Urosu | H04W 4/00 |
| 2007/0244692 A1* | 10/2007 | Balchandran | G06F 17/2715 704/9 |
| 2008/0086261 A1* | 4/2008 | Robinson | A63F 13/12 701/532 |
| 2012/0323991 A1* | 12/2012 | Wang | H04L 51/32 709/203 |

* cited by examiner

*Primary Examiner* — William C Trapanese
(74) *Attorney, Agent, or Firm* — Jordan IP Law, LLC (57) ABSTRACT

In one embodiment, a method includes receiving, from a client system of a first user of an online social network, voice input of the first user; receiving, from the client system, information indicating a current geo-location of the first user; parsing the voice input to identify one or more commands in the voice input; determining a data object of the online social network corresponding to the current geo-location of the first user and a command of the one or more commands associated with the current geo-location of the first user; and executing the command associated with the current geo-location of the first user on the online social network, wherein the executed command operates on the data object corresponding to the current geo-location of the first user.

18 Claims, 4 Drawing Sheets

VOICE COMMANDS FOR ONLINE SOCIAL NETWORKING SYSTEMS

PRIORITY

This application is a continuation under 35 U.S.C. § 120 of U.S. patent application Ser. No. 14/708,567, filed 11 May 2015, which is a continuation under 35 U.S.C. § 120 of U.S. patent application Ser. No. 13/652,767, filed 16 Oct. 2012.

TECHNICAL FIELD

This disclosure generally relates to performing actions on an online social network using audio inputs.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may transmit over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, or gyroscope. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a user of an online social network may use their mobile computing device to take particular actions on the online social network. An online social network includes a social graph that consists of particular types of nodes and edges. Because there are particular types of nodes and edges, simple and intuitive voice commands may be used to modify the social graph. For example, voice commands may be used to cause the social-networking system to create new nodes in the social graph or to create new edges connecting particular nodes. Furthermore, location information provided by the mobile computing device may be used to help parse a voice command to identify the appropriate action to perform on the social graph and the particular social-graph elements on which to perform the action. Thus, a user could use their mobile computing device to, for example, "check-in" to their current location, "friend" other users that are nearby, or perform similar actions on the online social network.

DESCRIPTION OF EXAMPLE EMBODIMENTS

Figure 1:
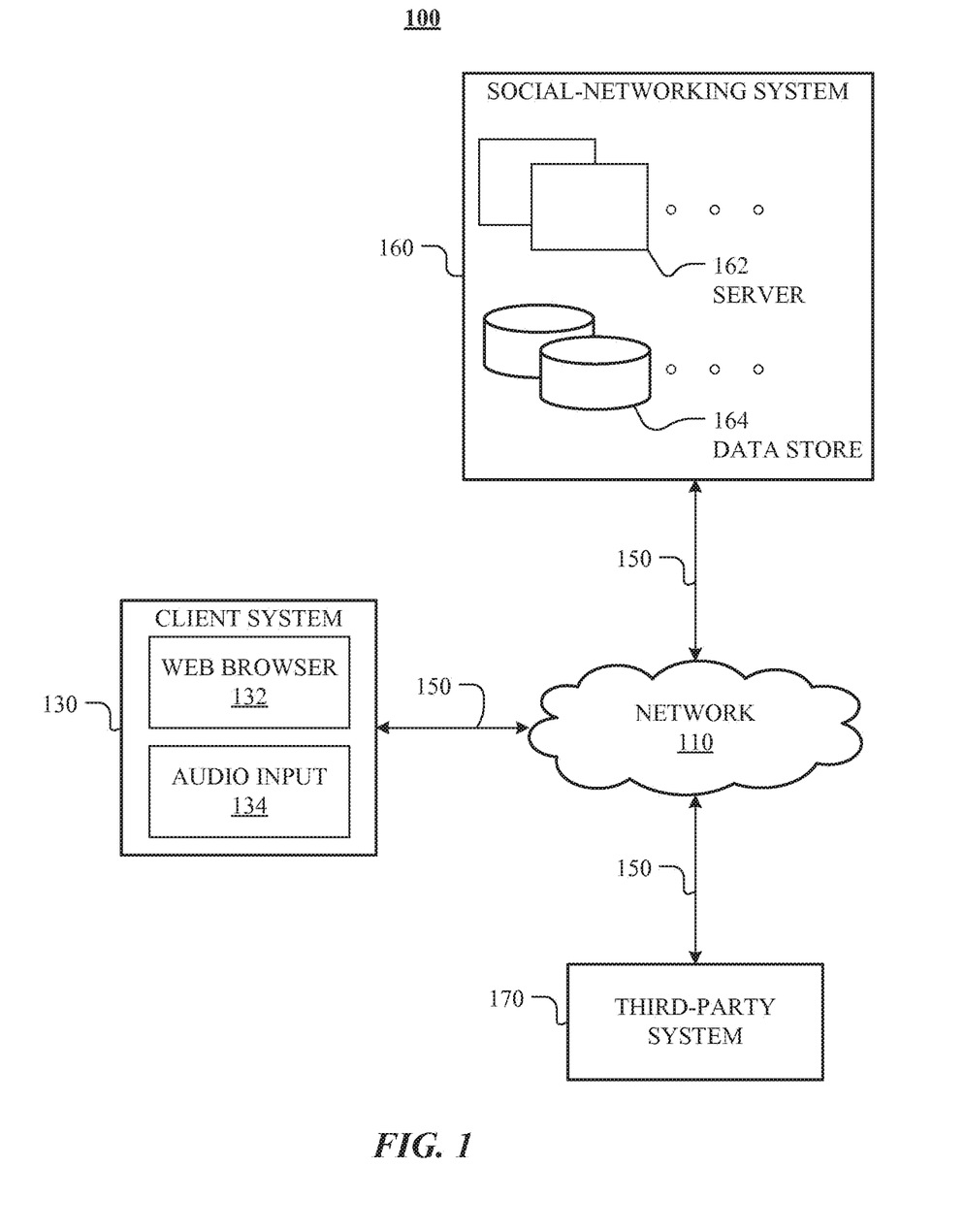
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate. Although this disclosure described accessing the social-networking system 160 and other systems in a particular manner, this disclosure contemplates accessing the social-networking system 160 or other systems in any suitable manner. As an example and not by way of limitation, a dedicated client application may be used to access the social-networking system 160.

In particular embodiments, client system 130 may include an audio input 134, such as a microphone, that is operable to receive and/or record voice messages or other audio data. As an example and not by way of limitation, a user of the client system 130 may make speak a voice message into an audio input 134, which may be converted into an electronic signal and processed by an audio adapter of the client system 130, allowing the voice message to be further analyzed or processed by the client system 130. Audio data received by the audio input 134 may be transmitted to a social-networking system 160, a third-party system 170, or another suitable system in any suitable manner. As an example and not by way of limitation, audio data may be transmitted via a web browser 132. As another example and not by way of limitation, audio data may be transmitted via a dedicated client application. Although this disclosure describes receiving particular audio data in a particular manner, this disclosure contemplates receiving any suitable audio data in any suitable manner.

In particular embodiments, social-networking system 160 may be a network-addressable computing system that can host an online social network. Social-networking system 160 may generate, store, receive, and transmit social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (i.e., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, ad-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Ad-pricing modules may combine social information, the current time, location information, or other suitable information to provide relevant advertisements, in the form of notifications, to a user.

Figure 2:
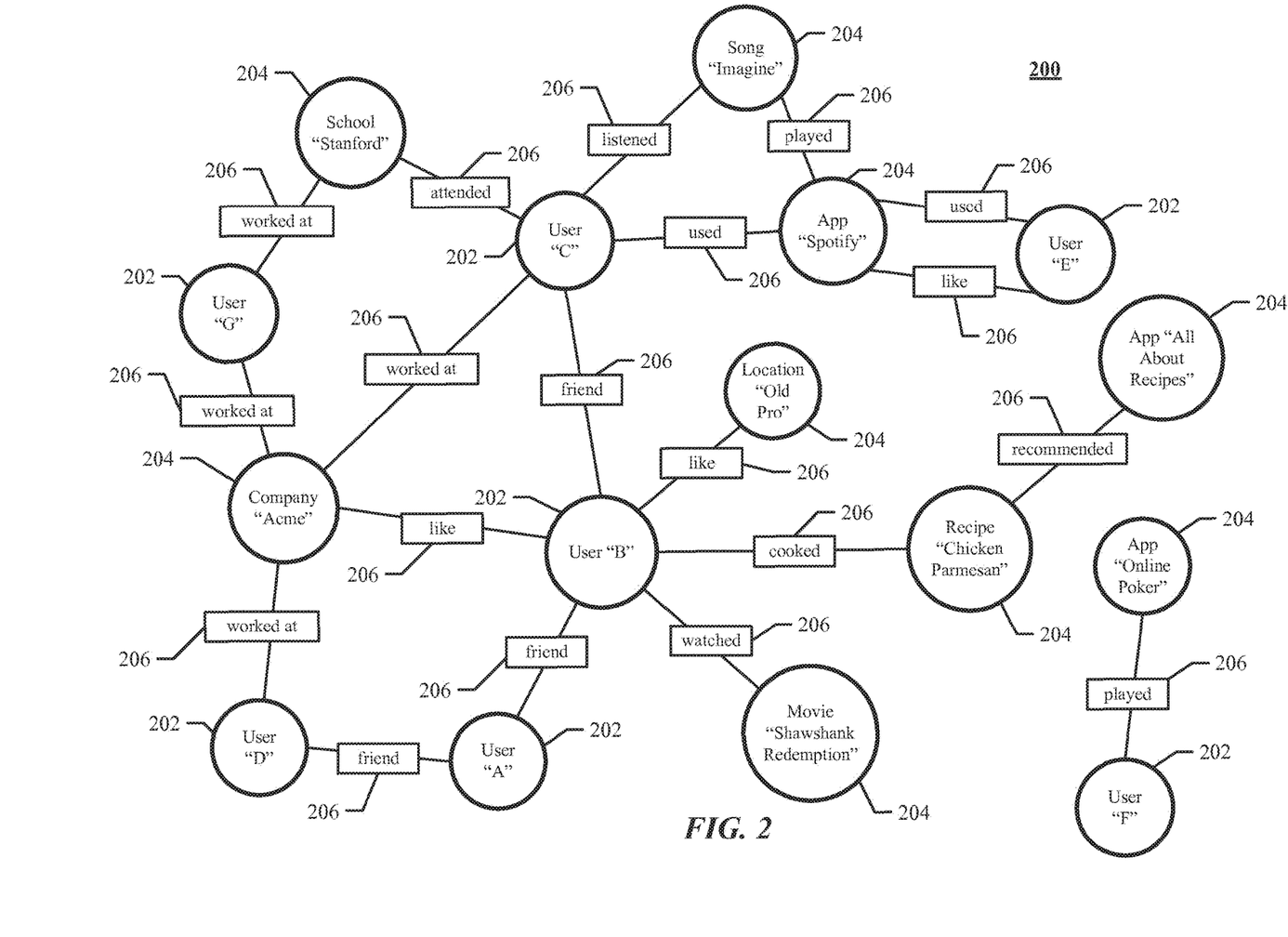
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to transmit to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may transmit a "friend request" to the second user. If the second user confirms the "friend request," social-networking system 160 may create an edge 206 connecting the first user's user node 202 to the second user's user node 202 in social graph 200 and store edge 206 as social-graph information in one or more data stores 24. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to an edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to transmit to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, the social-networking system 160 may use voice commands on a mobile client system 130 to take particular actions on an online social network. Because the social graph 200 has particular nodes and edges, and types of nodes and edges, simple and intuitive voice commands may be used to modify the social graph 200. As an example and not by way of limitation, voice commands may be used to cause the social-networking system 160 to create new concept nodes 204 or to create new edges 206 connecting particular nodes. Furthermore, the location information associated with a particular user may be used to help parse a voice command to identify the appropriate action to perform on the social graph 200 and the particular social-graph elements on which to perform the action. Thus, a user could use his mobile client system 130 to "check-in" to his current location, "friend" other users that are nearby, or perform similar actions on the online social network. In particular embodiments, the social-networking system 160 may modify the social graph 200 in response to voice messages and location information from a mobile client system 130 associated with a user. A user may speak into a microphone on their mobile client system 130, and say, for example, "check in here." The social-networking system 160 may then receive location information from the mobile client system 130 that indicates that the user is currently located at a particular location or event. The social-networking system 160 may then identify a concept node 204 in the social graph 200 corresponding to that particular location or event and identify the voice command "check in" as corresponding to a "check-in" edge 206. The social-networking system 160 may then generate a "check-in" edge 206 connecting the user node 202 associated with the user and the concept node 204 associated with the particular location or event. Although this disclosure describes using particular methods to process social voice commands on an online social network, this disclosure contemplates using any suitable method to process social voice commands on the online social network.

In particular embodiments, the social-networking system 160 may receive from a first user (corresponding to a first user node 202) a voice message comprising one or more commands. If mobile client system 130 includes an audio input 134, the mobile client system 130 may allow a user to speak a voice message that can be received and recorded by the mobile client system 130. A user may speak any suitable voice message into the audio input 134. In particular embodiments, the mobile client device 130 may include dictation software that can convert the user's voice into a sentence. Then, natural language processing software or another suitable system may be used to parse the sentence into one or more commands. In general, each command is a contiguous sequence of n items from a given sequence of speech. The items may be characters, phonemes, syllables, letters, words, base pairs, prefixes, or other identifiable items from the sequence of speech. Each command may include one or more parts from the voice message received from the first user. As an example and not by way of limitation, a first user may say "check in here", which may be parsed to identify the commands "check in" and "here". This may cause the social-networking system 160 to generate a "check-in" type edge 206 connecting the first user's user node 202 to the concept node 204 corresponding to the first user's current location (i.e., "here"). As another example and not by way of limitation, a first user may say "friend Steph", which may be pared to identify the commands "friend" and "Steph". This may cause the social-networking system 160 to generate a "friend" type edge connecting the first user's user node 202 to the user node 202 corresponding to a user named "Stephanie" who is near the first user's current location. Other example voice messages include: "like Acme"; "share with my family and work friends" after taking a picture with the mobile client system 130; "message Matt I'm running late". Although this disclosure describes receiving particular voice messages in a particular manner, this disclosure contemplates receiving any suitable voice messages in any suitable manner. Furthermore, although this disclosure describes particular systems performing particular processes, this disclosure contemplates any suitable systems performing any suitable processes. As an example and not by way of limitation, a user may speak into a mobile client system 130, and then audio data may be transmitted to the social-networking system 160, which may then process the audio data to parse the user's voice message and to identify particular voice commands. Alternatively, these steps described above may be performed using any suitable combination of the mobile client system 130, the social-networking system 160, or another suitable system.

In particular embodiments, the social-networking system 160 may receive location information about a user from a mobile client system 130 associated with the user. Location information for the mobile client system 130 may be continuously captured by the device (e.g., by special purpose client applications hosted on the device) and transmitted to the social-networking system 160. The social-networking system 160 may then log the location of the user after the location information is received. In particular embodiments, the social-networking system 160 may maintain a database of information relating to various locations or events. A location may be general, e.g., a city, or specific, e.g., a particular street name, or intersection, or GPS coordinate. Specific locations may also include various physical venues, such as businesses, restaurants, bars, train stations, airports, theaters, parks, and the like. Similarly, a variety of events may occur at these locations. Events may include concerts, movies, parties, social gatherings, conferences, business meetings, and the like. In particular embodiments, each location or event may correspond to a concept node 204 in the social graph 200. The social-networking system 160 may allow users to access information regarding each place using a client application (e.g., a web browser 132) hosted a client system 130. In particular embodiments, the social-networking system 160 may log or maintain various types of location information about the user. As an example and not by way of limitation, the social-networking system may support geo-social-networking system functionality including one or more location-based services that record the user's location. Users may access the geo-social-networking system using a special-purpose client application hosted by a mobile client system 130 of the user (or a web- or network-based application using a web browser 132). The client application may automatically access Global Positioning System (GPS) or other geo-location functions supported by the mobile client system 130 and report the user's current location (or presence at an event at that location) to the geo-social-networking system. In addition, the client application may support geo-social networking functionality that allows users to check-in at various venues or events and communicate this to other users. A check-in to a given venue or event may occur when a user is physically located at the venue or event and, using a mobile device, access the geo-social-networking system to register the user's presence. A user may select a venue or event from a list of existing venues or events near to the user's current position or create a new venue or event. The mobile client system 130 may determine its geo-location based on GPS signals, locations of WLAN access points, cellular signal triangulation, or by using another suitable geo-location method. The mobile client system 130 may also indicate that a user is at a particular event or venue based on information provided at the event or venue. As an example and not by way of limitation, event or venues may have unique identifiers that can be provided to the mobile client system 130 (e.g., scannable QR codes, location IDs that can be entered into the device, etc.). In particular embodiments, location information received from multiple users may be used to determine which users are proximate to each other. Thus, the social-networking system 160 may receive location information indicating that a first user is proximate to a second user. Although this disclosure describes determining particular location information for users in a particular manner, this disclosure contemplates determining any suitable location information for users in any suitable manner.

In particular embodiments, social-networking system 160 may determine or calculate, for each command identified in the voice message, a score that the command corresponds to a social-graph element. The score may be, for example, a confidence score, a probability, a quality, a ranking, another suitable type of score, or any combination thereof. As an example and not by way of limitation, the social-networking system 160 may determine a probability score (also referred to simply as a "probability") that the command corresponds to a social-graph element, such as a user node 202, a concept node 204, or an edge 206 of social graph 200. The probability score may indicate the level of similarity or relevance between the command and a particular social-graph element. There may be many different ways to calculate the probability. The present disclosure contemplates any suitable method to calculate a probability score for a command identified in a search query. In particular embodiments, the social-networking system 160 may determine a probability, p, that a command identified in a voice message corresponds to a particular social-graph element. The probability, p, may be calculated as the probability of corresponding to a particular social-graph element, k, given a particular voice message, X. In other words, the probability may be calculated as $p=(k|X)$. As an example and not by way of limitation, a probability that a command corresponds to a social-graph element may calculated as an probability score denoted as $p_{i,j,k}$. The input may be a text query $X=(x_1, x_2, \ldots, x_N)$, and a set of classes. For each (i:j) and a class k, the social-networking system 160 may compute $p_{i,j,k}=p(\text{class}(x_{i:j})=k|X)$. In particular embodiments, the social-networking system 160 may determine the probability that a particular command corresponds to a social-graph element based on a language model. Any suitable probabilistic language model may be used to determine the probability that a particular command corresponds to a particular social-graph element. As an example and not by way of limitation, the social-networking system 160 may use an n-gram model, a segmental Markov model, a grammar-language model, another suitable probabilistic language model, or any combination thereof. Although this disclosure describes determining whether voice commands correspond to social-graph elements in a particular manner, this disclosure contemplates determining whether voice commands correspond to social-graph elements in any suitable manner. Moreover, although this disclosure describes determining whether a command from a voice message corresponds to a social-graph element using a particular type of score, this disclosure contemplates determining whether a command corresponds to a social-graph element using any suitable type of score.

In particular embodiments, the social-networking system 160 may determine the probability that a particular command corresponds to a social-graph element based on the location information associated with the first user. As an example and not by way of limitation, when determining a probability, p, that a command corresponds to a particular social-graph element, the calculation of the probability may also factor in location information. Thus, the probability of corresponding to a particular social-graph element, k, given a particular voice message, X, and location information, L, may be calculated as $p=(k|X,L)$. Location information may be used to determine the relevance of a particular social-graph element to a particular user. User nodes 202 and concept nodes 204 corresponding to users and concepts (e.g., geographic positions, venues, events), respectively, that are proximate to the first user may be considered more relevant to the first user than more distant users and concepts. As an example and not by way of limitation, the social-networking system 160 may determine that the command "here" corresponds to a venue at the geographic location reported by the user's mobile client system 130. As another example and not by way of limitation, the social-networking system 160 may determine that the command "this event" corresponds to an event that the user "checked-in" to on the online social network earlier that day. As yet another example and not by way of limitation, the social-networking system 160 may determine that the command "starbucks" (which could correspond to various locations of the STARBUCKS coffee shop) corresponds to the STARBUCKS coffee shop that is nearest to the first user's current location. Although this disclosure describes determining whether commands correspond to social-graph elements based on location information in a particular manner, this disclosure contemplates determining whether commands correspond to social-graph elements based on location information in any suitable manner.

In particular embodiments, the social-networking system 160 may determine the probability that a particular command corresponds to a social-graph element based on social-graph information. As an example and not by way of limitation, when determining a probability, p, that a command corresponds to a particular social-graph element, the calculation of the probability may also factor in social-graph information. Thus, the probability of corresponding to a particular social-graph element, k, given a particular voice message, X, and social-graph information, G, may be calculated as $p=(k|X,G)$. Social-graph information may be used to determine the social relevance of a particular social-graph element to a particular user. User nodes 202 and concept nodes 204 that are connected to the first user node 202 directly by an edge 206 may be considered relevant to the first user. Furthermore, in particular embodiments, the closer the second node is to the first user node, the more relevant the second node may be considered to the first user node. That is, the fewer edges 206 separating the first user node 202 from a particular user node 202 or concept node 204 (i.e., the fewer degrees of separation), the more relevant that user node 202 or concept node 204 may be considered to the first user. In particular embodiments, the probability that a command from a voice message corresponds to a particular node may be based on the degree of separation between the user node 202 of the first user and the particular node. A particular command may have a higher probability of corresponding to a social-graph element that is closer in the social graph 200 to the querying user (i.e., fewer degrees of separation between the element and the first user node 202) than a social-graph element that is further from the user (i.e., more degrees of separation). As an example and not by way of limitation, if the first user speaks the voice message "friend jenny," the calculated probability that the command "jenny" corresponds to a second-degree user node 202 (i.e., a node that is two degrees of separation from the user node 202 of the first user) for a user named "Jenny" may be higher than the calculated probability that this command corresponds to a third-degree user node 202 for a different user also named "Jenny." In particular embodiments, the social-networking system 160 may only determine the probability that a particular command corresponds to node within a threshold degree of separation of the user node 202 corresponding to the first user. A particular node may only be considered relevant to the first user if that particular node is within a threshold degree of separation of the user node 202 of the first user. Thus, nodes beyond the threshold degree of separation may be assigned a zero or null probability of corresponding to the command. Alternatively, when resolving voice commands, the social-networking system 160 may only access nodes within the threshold degree of separation and only determine probabilities for those nodes. The threshold degree of separation may be, for example, one, two, three, or all. Although this disclosure describes determining whether commands correspond to social-graph elements based on social-graph information in a particular manner, this disclosure contemplates determining whether commands correspond to social-graph elements based on social-graph information in any suitable manner.

In particular embodiments, the probability that a command corresponds to a particular node may be based on the search history associated with the first user. Nodes that the first user has previously accessed, or are relevant to the nodes the first user has previously accessed, may be more likely to be the target of the first user's voice command. As an example and not by way of limitation, if the first user has previously visited the concept-profile page for the location "Old Pro," then when determining the probability that the command "old pro" corresponds to the concept node 204 corresponding to this page, the social-networking system 160 may determine that the concept node 204 for "Old Pro"

has a relatively high probability of corresponding to the command "old pro" because the first user has previously accessed that concept node 204 (and may in fact already be connected to that node with a "viewed" edge 206). Although this disclosure describes determining whether commands correspond to social-graph elements based on search history in a particular manner, this disclosure contemplates determining whether commands correspond to social-graph elements based on search history in any suitable manner.

In particular embodiments, the social-networking system 160 may identify one or more nodes or one or more edges having a score greater than a threshold score. Each of the identified nodes or identified edges 206 may correspond to at least one of the commands. As an example and not by way of limitation, the command may only be identified as corresponding to a particular social-graph element, k if $p_{i,j,k} > p_{threshold}$. Although this disclosure describes identifying node and edges that corresponding to commands in a particular manner, this disclosure contemplates identifying edges 206 that corresponding to commands in any suitable manner.

In particular embodiments, the social-networking system 160 may generate one or more new nodes or one or more new edges in the social graph 200 based on the identified nodes or identified edges. In this way, various social commands, such as "check-in", "friend", "like," "share," "message," and the like may be executed and the social graph 200 may be modified accordingly. In particular embodiments, the social-networking system 160 may generate one or more new edges 206 in the social graph 200 connecting the user node 202 of the first user to one or more of the identified nodes. A user may desire to take particular social actions, such as "liking", "checking in" or "friending" on the online social network, which indicate a particular relationship between the user and another user or concept. The user may use particular voice commands to take these actions, which may be represented by new edges 206 in the social graph connecting the user node 202 of the first user to another node. As an example and not by way of limitation, in response to the voice message "check in here", which contains the commands "check in" and "here" corresponding to a "check-in" type edge 206 and a concept node 204 of the first user's current location, respectively, the social-networking system 160 may generate a new "check-in" type edge 206 connecting the user node 202 of the first user to the concept node 204 of the user's current location. As another example and not by way of limitation, in response to the voice message "like this event", which contains the commands "like" and "this event" corresponding to a "like" type edge 206 and a concept node 204 of an event the first user is currently attending (which may be determined based on his location information), respectively, the social-networking system 160 may generate a new "like" type edge 206 connecting the user node 202 of the first user to the concept node 204 of the event. In particular embodiments, the social-networking system 160 may generate one or more new nodes and one or more new edges in the social graph 200, where the new edges 206 connect the new nodes to the user node 202 corresponding to the first user. The new nodes may correspond to content files received from the mobile client system 130 of the first user, wherein each new node corresponds to a particular content file. A user may desire to post or send photos, comments, messages, or other suitable content on the online social network. The user may use particular voice commands to send or post these content files (which may be any suitable file type), and these new content files may then be represented in the social graph 200 by new concept nodes 204. New profile pages may also be generated for any new content files received. As an example and not by way of limitation, the first user may take a photo with his mobile client system 130 and then input the voice message "post to this event's page." The mobile client system 130 may then parse the voice message to identify the commands "post to", "this event's", and "page." The command "post to" may correspond to a new node generated by the social-networking system 160 corresponding to the photo taken by the first user. The command "this event's" may correspond to a concept node 204 for an event the first user is currently attending (which may be determined, for example, based on the first user's location information). Thus, in response to this voice message, the social-networking system 160 may modify the social graph 200 by generating a new concept node 204 corresponding to the photo and then generate a new edge 206 connecting the new concept node 204 with the concept node 204 for the event the first user is currently attending. Furthermore, the photo may then be displayed on a concept-profile page corresponding to the concept node 204 for the event (a new concept-profile page may also be generated for the photo). Although this disclosure describes generating new nodes and new edges in the social graph in a particular manner, this disclosure contemplates generating new nodes and new edges in the social graph in any suitable manner.

In particular embodiments, the social-networking system 160 may identify privacy setting corresponding to at least one of the commands of the voice message. The privacy setting may indicate which second users of the online social network may access content files corresponding to a new node generated by the social-networking system 160, as described previously. Once the privacy setting is identified, the social-networking system 160 may then apply the privacy setting to one or more of the new nodes, thereby restricting access to the corresponding content files. As an example and not by way of limitation, the first user may take a photo with his mobile client system 130 and then input the voice message "share this photo with my friends." The mobile client system 130 may parse the voice message to identify the commands "share", "this photo" and "with my friends", where the command "this photo" corresponds to a new node generated by the social-networking system 160 corresponding to the photo taken by the first user. The command "with my friends" corresponds to a privacy setting indicating that the photo should only be viewable by first-degree friends of the first user (i.e., those second users connected by a "friend" type edge 206 to the user node 202 of the first user). Once the photo is posted on the online social network, the social-networking system 160 may then apply the privacy settings as described above to the photo, allowing only the first user's first-degree friends to view the photo. Although this disclosure describes identifying and applying privacy settings in a particular manner, this disclosure contemplates identifying or applying privacy setting in any suitable manner.

Figure 3:
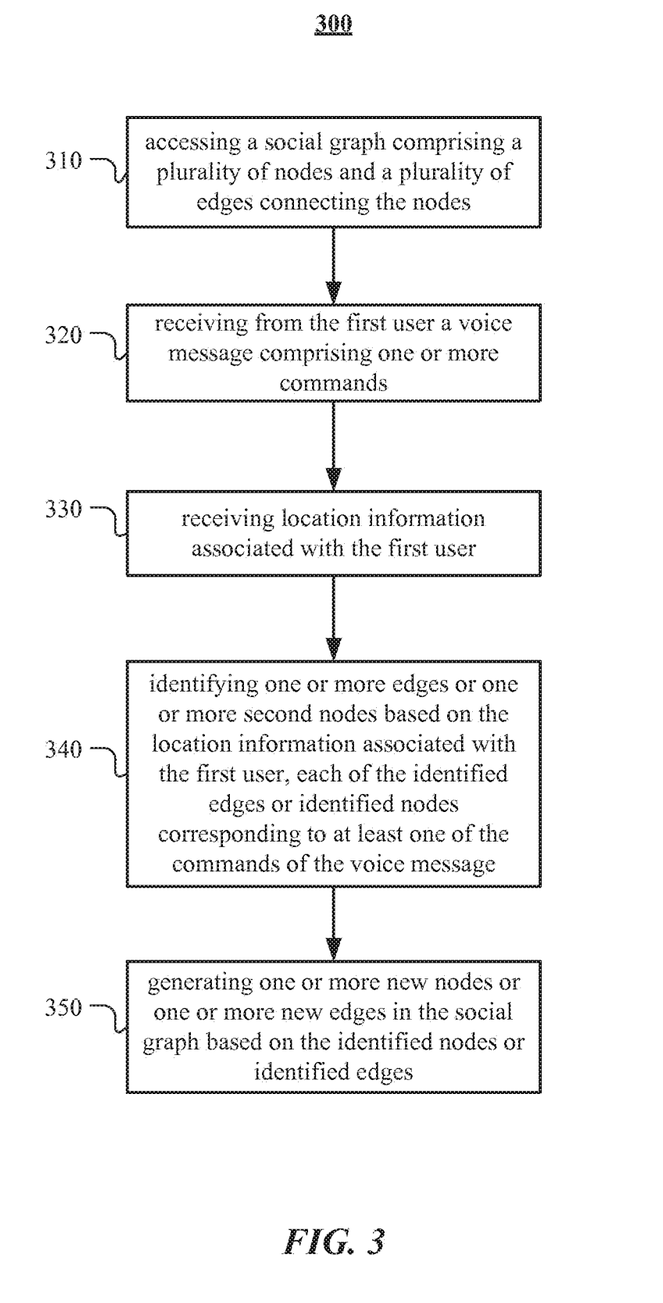
FIG. 3 illustrates an example method for managing voice commands on an online social network.

FIG. 3 illustrates an example method 300 for managing voice commands on an online social network. The method may begin at step 310, where the social-networking system 160 may access a social graph 200 comprising a plurality of nodes and a plurality of edges 206 connecting the nodes. The nodes may comprise a first user node 202 and a plurality of second nodes (one or more user nodes 202, concepts nodes 204, or any combination thereof). At step 320, the social-networking system 160 may receive from the first user a voice message comprising one or more commands. At step 330, the social-networking system 160 may receive location information associated with the first user. At step 340, the social-networking system 160 may identify one or more edges or one or more second nodes based on the location information associated with the first user. Each of the identified edges or identified nodes may correspond to at least one of the commands of the voice message. At step 350, the social-networking system 160 may generate one or more new nodes or one or more new edges in the social graph based on the identified nodes or identified edges. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
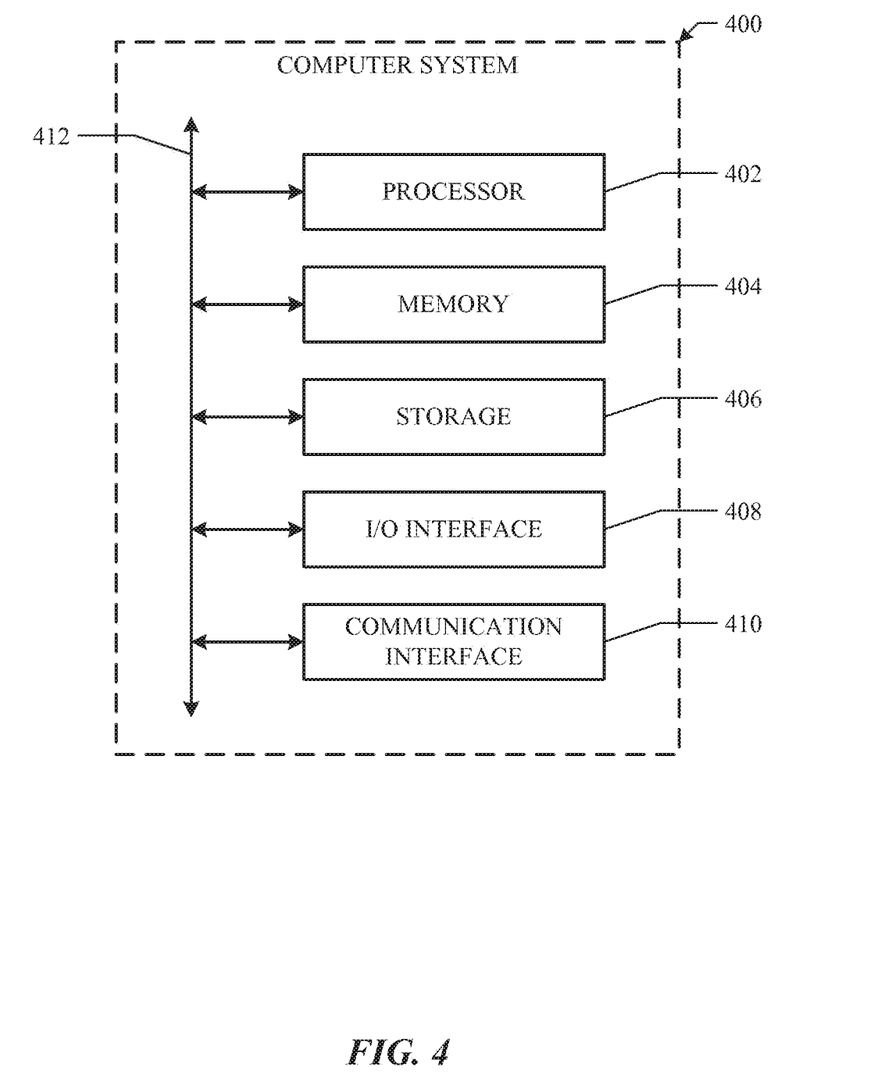
FIG. 4 illustrates an example computer system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache. Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computing systems:
    receiving, from a client system of a first user of an online social network, voice input of the first user, wherein the first user is represented by a first profile;
    receiving, from the client system, information indicating a current geo-location of the first user;
    parsing, based on the current geo-location of the first user, the voice input to identify one or more commands in the voice input, and identify an action to perform on a social graph associated with the online social network and one or more social-graph elements on which to perform the action;
    determining a second profile of the online social network representing the current geo-location of the first user and a command of the one or more commands associated with the current geo-location of the first user; and
    executing the command associated with the current geo-location of the first user on the online social network to modify the social graph based on the command and the current geo-location, wherein the executed command operates on a first data object from the first profile representing the first user and a second data object from the second profile representing the current geo-location of the first user.

2. The method of claim 1, wherein the voice input is a voice message received at an audio input of the client system.

3. The method of claim 1, wherein parsing the voice input comprises natural-language processing the voice input to identify one or more commands in the voice input.

4. The method of claim 1, wherein each identified command comprises one or more n-grams.

5. The method of claim 4, wherein parsing the voice input comprises processing the voice input to identify a sequence of n-grams in the voice input, and wherein each command is identified based on a relative position of each n-gram in the sequence.

6. The method of claim 1, wherein the information indicating the current geo-location of the first user comprises one or more of a Global Positioning System coordinate, a street name, a street intersection, or an identity of a physical venue.

7. The method of claim 1, wherein the information indicating the current geo-location of the first user is determined by the client system based on one or more of a Global Positioning System signal, a wireless local area network signal, a cellular signal, or a quick response code.

8. The method of claim 1, further comprising:
    accessing a social graph comprising a plurality of nodes and a plurality of edges connecting the nodes, each of the edges between two nodes establishing a single degree of separation between them, the nodes comprising:
        a first node corresponding to the first user, and
        a plurality of second nodes corresponding to a plurality of profiles of the online social network, respectively, each second node being of a particular node-type corresponding to the respective profile.

9. The method of claim 8, wherein the executed command comprises a social-networking action, the social-networking action indicating a particular relationship, and wherein the first and second profiles correspond to nodes of the social graph.

10. The method of claim 8, wherein the second profile representing the current geo-location of the first user corresponds to a concept-type node of the social graph.

11. The method of claim 1, further comprising:
    calculating, for each of the identified commands, a probability that the identified command corresponds to a particular type of social-graph element;
    determining, for each of the identified commands, one or more types of social-graph elements corresponding to the respective identified command based on the calculated probability that the identified command from the voice input corresponds to a particular type of social-graph element exceeds a threshold probability; and
    generating, responsive to determining that at least one probability exceeds the threshold probability, one or more social-graph elements in a social graph of the online social network, each generated social-graph element being one of the determined types.

12. The method of claim 11, wherein determining, for each identified command, the one or more types of social-graph elements corresponding to the respective identified command is based on the respective determined probability.

13. The method of claim 11, wherein the probabilities are determined based on the current geo-location of the first user.

14. The method of claim 11, wherein one or more of the probabilities are determined based on a degree of separation between the first user node and a second node in the social graph.

15. The method of claim 11, wherein determining, for each identified command, the one or more types of social-graph elements corresponding to the respective identified command is based on information indicating that the first user is proximate to a particular second user.

16. One or more computer-readable non-transitory storage media embodying software that is operable when executed to:
    receive, from a client system of a first user of an online social network, voice input of the first user, wherein the first user is represented by a first profile;
    receive, from the client system, information indicating a current geo-location of the first user;
    parse, based on the current geo-location of the first user, the voice input to identify one or more commands in the voice input, and identify an action to perform on a social graph associated with the online social network and one or more social-graph elements on which to perform the action;
    determine a second profile of the online social network representing the current geo-location of the first user and a command of the one or more commands associated with the current geo-location of the first user; and execute the command associated with the current geo-location of the first user on the online social network to modify the social graph based on the command and the current geo-location, wherein the executed command operates on a first data object from the first profile representing the first user and a second data object from the second profile representing the current geo-location of the first user.

17. The media of claim 16, wherein the voice input is a voice message received at an audio input of the client system.

18. A system comprising: one or more processors; and a memory coupled to the processors comprising instructions executable by the processors, the processors operable when executing the instructions to:
receive, from a client system of a first user of an online social network, voice input of the first user, wherein the first user is represented by a first profile;
receive, from the client system, information indicating a current geo-location of the first user;
parse, based on the current geo-location of the first user, the voice input to identify one or more commands in the voice input, and identify an action to perform on a social graph associated with the online social network and one or more social-graph elements on which to perform the action;
determine a second profile of the online social network representing the current geo-location of the first user and a command of the one or more commands associated with the current geo-location of the first user; and
execute the command associated with the current geo-location of the first user on the online social network to modify the social graph based on the command and the current geo-location, wherein the executed command operates on a first data object from the first profile representing the first user and a second data object from the second profile representing the current geo-location of the first user.

\* \* \* \* \*